(12) United States Patent
Karashima et al.

(10) Patent No.: US 10,836,451 B2
(45) Date of Patent: Nov. 17, 2020

(54) BODY FRAME REINFORCING STRUCTURE FOR SADDLE RIDING VEHICLE

(71) Applicant: HONDA MOTOR CO., LTD., Tokyo (JP)

(72) Inventors: Akiyuki Karashima, Asaka (JP); Yasuhiro Ohashi, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 16/253,762

(22) Filed: Jan. 22, 2019

(65) Prior Publication Data

US 2019/0241229 A1 Aug. 8, 2019

(30) Foreign Application Priority Data

Feb. 5, 2018 (JP) .................................. 2018-018661

(51) Int. Cl.
*B62K 11/04* (2006.01)
*B62K 19/28* (2006.01)
*B62J 11/13* (2020.01)

(52) U.S. Cl.
CPC .............. *B62K 11/04* (2013.01); *B62K 19/28* (2013.01); *B62J 11/13* (2020.02)

(58) Field of Classification Search
CPC ........... B62K 11/04; B62K 19/28; B62J 11/13
See application file for complete search history.

(56) References Cited

U.S. PATENT DOCUMENTS

| | | | | |
|---|---|---|---|---|
| 2004/0124031 A1* | 7/2004 | Tanabe | ........................ | B62J 1/12 180/309 |
| 2004/0154852 A1* | 8/2004 | Miyashiro | .............. | B62K 11/04 180/219 |
| 2004/0238254 A1* | 12/2004 | Iwata | ........................ | B60K 5/02 180/219 |
| 2014/0131128 A1* | 5/2014 | Schuhmacher | ........ | F02M 35/162 180/219 |
| 2015/0129342 A1* | 5/2015 | O'Rourke | ............. | F02M 35/162 180/219 |
| 2015/0259019 A1* | 9/2015 | Ito | ............................... | B62J 9/40 362/473 |
| 2015/0344093 A1* | 12/2015 | Inoue | ........................ | B62M 7/04 180/220 |
| 2016/0090142 A1* | 3/2016 | Sasaki | ....................... | B62J 99/00 180/219 |
| 2019/0084635 A1* | 3/2019 | Mayuzumi | .................. | B62J 1/08 |

FOREIGN PATENT DOCUMENTS

| | | |
|---|---|---|
| JP | H05-254478 | 10/1993 |
| JP | 2008-143511 | 6/2008 |
| JP | 2014-061741 | 4/2014 |
| JP | 6106482 | 3/2017 |

OTHER PUBLICATIONS

Japanese Office Action dated Oct. 1, 2019, English translation included, 13 pages.

* cited by examiner

*Primary Examiner* — Drew J Brown

(74) *Attorney, Agent, or Firm* — Rankin, Hill & Clark LLP

(57) ABSTRACT

A motorcycle having a body frame reinforcing structure includes a right and left pair of down frames supporting an engine in a body frame. The right and left down frames are coupled using the cross member. The cross member includes a plurality of mounted portions mounted to the right and left respective down frames.

12 Claims, 10 Drawing Sheets

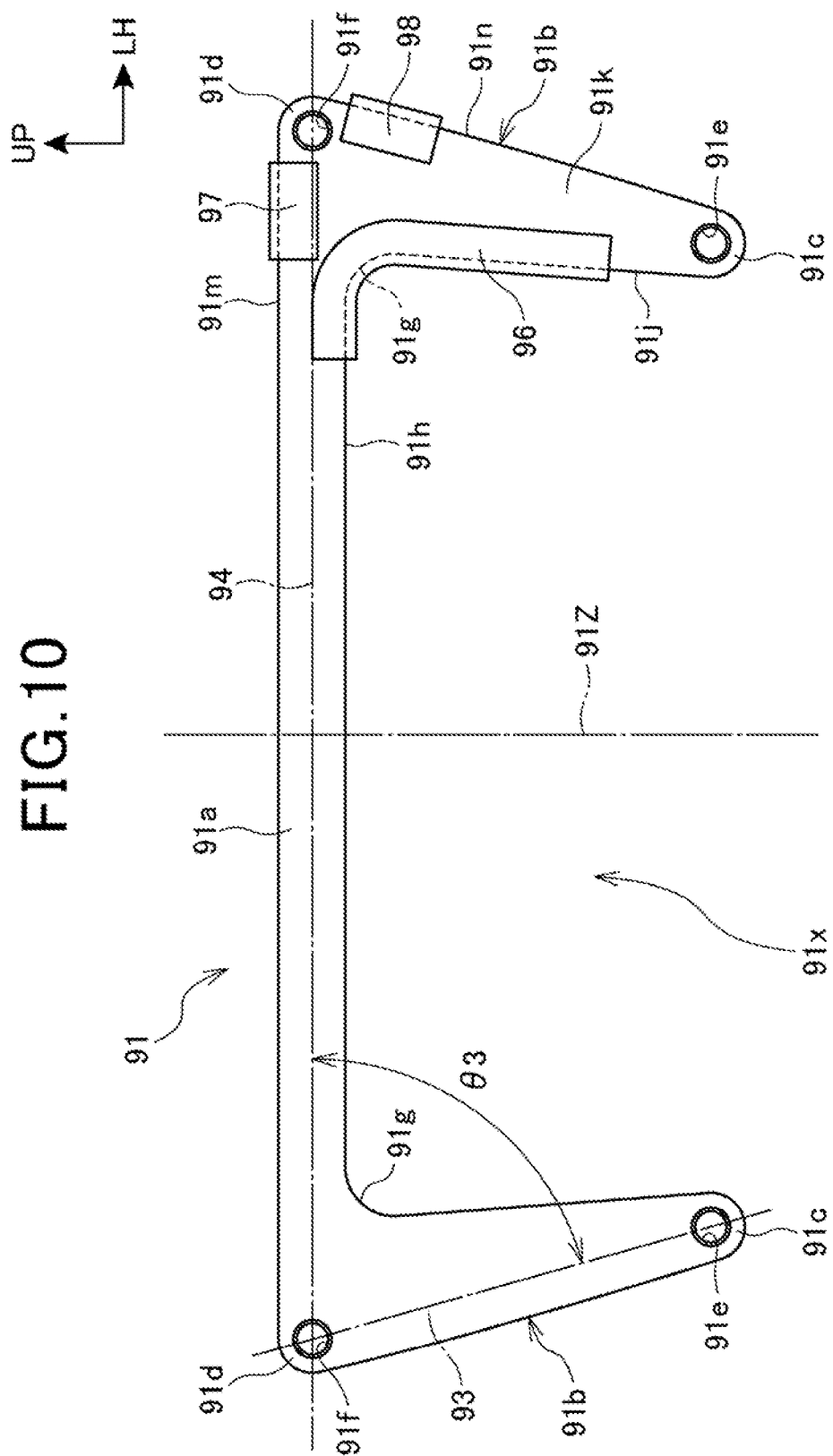

BODY FRAME REINFORCING STRUCTURE FOR SADDLE RIDING VEHICLE

INCORPORATION BY REFERENCE

The present application claims priority under 35 U.S.C. § 119 to Japanese Patent Application No. 2018-018661 filed on Feb. 5, 2018. The content of the applications is incorporated herein by reference in its entirety.

TECHNICAL FIELD

The present invention relates to a body frame reinforcing structure for a saddle riding vehicle.

BACKGROUND ART

Conventionally, it has been known to improve a rigidity of a body frame by disposing a cross member that couples between a right and left pair of down frames disposed at rear of a radiator in side view (for example, see Patent Literature 1).

In a motorcycle, for example, when braking during turning, various loads are applied to the body frame.

CITATION LIST

Patent Literature

[Patent Literature 1] Japanese Patent No. 6106482

SUMMARY OF INVENTION

Technical Problem

In Patent Literature 1, while various kinds of ingenuities are made, such as an increased frame plate thickness, in order to enhance the rigidity of the body frame, the increased frame plate thickness has had a problem of a heavy vehicle weight.

The object of the present invention is to provide a body frame reinforcing structure for a saddle riding vehicle that ensures enhancing a rigidity of a body frame while reducing an increase in a vehicle weight.

Solution to Problem

According to an aspect of a first aspect of the present invention, there is provided a body frame reinforcing structure for a saddle riding vehicle that includes a right and left pair of down frames (18) supporting an engine (11) in a body frame (10A), and the right and left down frames (18) are coupled using a cross member (45,91). In the body frame reinforcing structure for the saddle riding vehicle, the cross member (45,91) includes a plurality of mounted portions (45p, 91c, 91d) mounted on the right and left respective down frames (18).

In a second aspect of the above-described invention, the cross member (45, 91) may have a cut-out portion (45e, 45f, 45g, 45s, 91x) between the plurality of mounted portions (45p, 91c).

In a third aspect of the above-described invention, the cut-out portion (45e, 45f, 45g, 45s, 91x) may have a corner portion (45x, 45y, 91g) that may be formed into an arc shape.

In a fourth aspect of the above-described invention, the cross member (45, 91) may include a harness mounting portion (45b, 45c, 91a, 91b) to which a wire harness (61, 65) is mounted, and the wire harness (61, 65) may be passed through the cut-out portion (45e, 45f, 45g, 45s, 91x).

In a fifth aspect of the above-described invention, the cross member (45) may be removably/attachably disposed with respect to the down frame (18), the cross member (45) may have a pair of the cut-out portions (45e, 45f, 45g, 45s) at least at opposed positions, and the wire harness (61, 65) may be passed through only one cut-out portion (45g) of the pair of cut-out portions (45g, 45s).

In a sixth aspect of the above-described invention, the cross member (45) may include a plurality of arm portions (45b, 45c) including the plurality of mounted portions (45p) and a wide-width portion (45a) to which the plurality of arm portions (45b, 45c) are coupled, and the wide-width portion (45a) may be formed to be wider than the plurality of arm portions (45b, 45c).

In a seventh aspect of the above-described invention, the plurality of mounted portions (45p) may be mounted to an enlarged width portion (18n) and an engine supporting portion (18j) disposed in the down frame (18).

In an eighth aspect of the above-described invention, the plurality of mounted portions (45p) may be fastened to the down frame (18) from a vehicle front side.

In a ninth aspect of the above-described invention, the mounted portions (45p) disposed in an upper side among the plurality of mounted portions (45p) disposed on a right and left of the cross member (45) may have a wider interval mounted on the right and left down frames (18) in a vehicle width direction.

Advantageous Effects of Invention

The cross member of the first aspect of the present invention includes the plurality of mounted portions that are mounted to the right and left respective down frames; therefore receiving an external force, which is applied to the body frame, on a surface ensures enhancing a rigidity (flexural rigidity and torsional rigidity), thereby ensuring reducing an increase in a vehicle weight compared with a conventional structure in which each one position of both ends of the cross member is mounted on each of the down frames.

In the second aspect of the above-described invention, the cross member has the cut-out portion between the plurality of mounted portions, thereby ensuring a lightweight cross member while enhancing a rigidity of the body frame.

In the third aspect of the above-described invention, the corner portion of the cut-out portion is formed into the arc shape, thereby ensuring a reduced stress concentration at the corner portion of the cut-out portion and ensuring an increased strength of the cross member.

In the fourth aspect of the above-described invention, the cross member includes the harness mounting portion to which the wire harness is mounted, and the wire harness is passed through the cut-out portion, thereby ensuring compactly piping and reliably positioning the wire harness.

In the fifth aspect of the above-described invention, the cross member is removably/attachably disposed with respect to the down frame, the cross member has the pair of cut-out portions at least at the opposed positions, and the wire harness is passed through only one cut-out portion of the pair of cut-out portion, thereby ensuring removing/attaching the cross member without removing the wire harness.

In the sixth aspect of the above-described invention, the cross member includes the plurality of arm portions including the plurality of mounted portions and the wide-width portion to which the plurality of arm portions are coupled, and the wide-width portion is formed to be wider than the plurality of arm portions, thereby ensuring protecting a vehicle constituting member disposed at rear of the wide-width portion from a scatter and the like.

In the seventh aspect of the above-described invention, the plurality of mounted portions are mounted to the enlarged width portion and the engine supporting portion disposed in the down frame, and therefore, the cross member can be further strongly mounted on the down frame.

In the eighth aspect of the above-described invention, the plurality of mounted portions are fastened to the down frame from the vehicle front side, thereby ensuring further easily replacing the cross member with a cross member having another shape or another material for the purpose of, for example, adjusting the rigidity of the body frame.

In the ninth aspect of the above-described invention, the mounted portions disposed in the upper side among the plurality of mounted portions disposed on the right and left of the cross member have the wider interval mounted on the right and left down frames in the vehicle width direction. Therefore, making intervals between the mounted portions in the vehicle width direction different in the vertical direction ensures restricting the mounted portions on the upper side and the mounted portions on the lower side of the cross member from simultaneously deforming in a different manner when a torsion force acts on the body frame, thereby ensuring reduced twisting of the body frame.

BRIEF DESCRIPTION OF DRAWINGS

FIG. 10 is a front view illustrating a cross member of a second embodiment.

DESCRIPTION OF EMBODIMENTS

Figure 1:
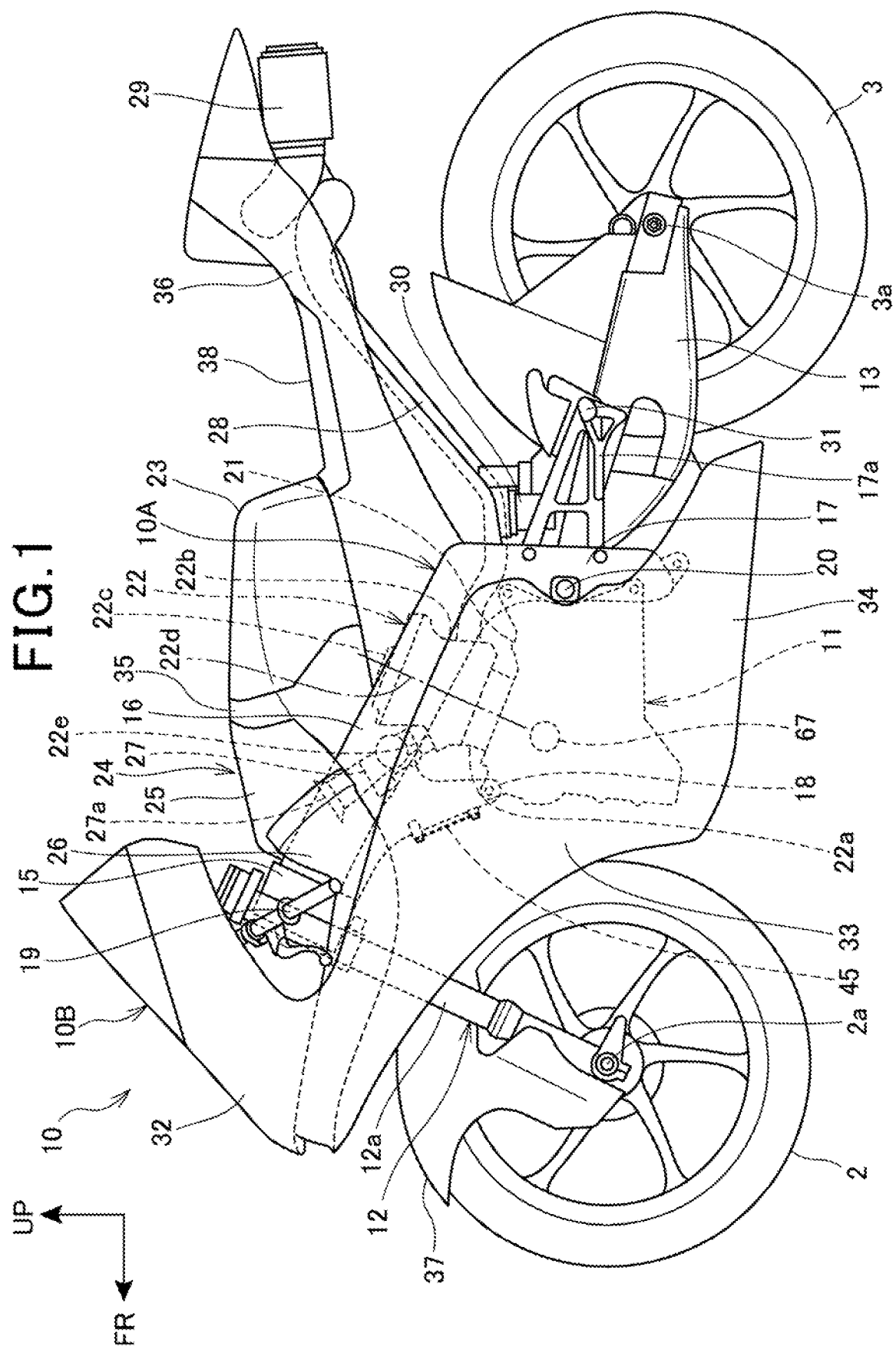
FIG. 1 is a left side view illustrating a motorcycle including a body frame reinforcing structure of a first embodiment according to the present invention.

The following describes one embodiment of the present invention with reference to the drawings. It is to be noted that, throughout the explanation, descriptions of directions, such as front, rear, right, left, up, and down, are identical to directions with respect to a vehicle body, unless otherwise stated. In each drawing, reference numeral FR denotes a front side of the vehicle body, reference numeral UP denotes an upper side of the vehicle body, and reference numeral LH denotes a left side of the vehicle body.

First Embodiment

FIG. 1 is a left side view illustrating a motorcycle 10 including a body frame reinforcing structure of a first embodiment according to the present invention.

The motorcycle 10 includes a body frame 10A. The body frame 10A has a center portion in which an engine 11 is disposed. The body frame 10A has a front end portion where a front fork 12 is steerably supported. The body frame 10A has a lower portion where a swing arm 13 is supported swingable up and down. The front fork 12 has a lower portion where a front wheel 2 is supported. The swing arm 13 has a rear end portion where a rear wheel 3 is supported.

The motorcycle 10 is a saddle riding vehicle including a seat 38 on which an occupant seats. The seat 38 is disposed on an upper portion of the body frame 10A.

A significant portion of the body frame 10A and the engine 11 is covered with a vehicle body cover 10B made of resin.

The body frame 10A includes a head tube 15, a right and left pair of main frames 16, a right and left pair of pivot frames 17, a right and left pair of seat frames (not illustrated), a right and left pair of down frames 18.

The head tube 15 is disposed at the front end portion of the body frame 10A. The right and left main frames 16 inclinedly extend obliquely downward to the rear from the head tube 15. The right and left pivot frames 17 extend downward from a rear end of the right and left main frames 16. The right and left seat frames extend upward to the rear up to the rear portion of the vehicle from upper portions of the right and left pivot frames 17. The right and left down frames 18 extend obliquely downward to the rear from lower portions of the right and left main frames 16, and are disposed at front and obliquely upper sides of the engine 11 in side view.

The head tube 15 turnably supports the front fork 12 via a steering shaft (not illustrated). The front wheel 2 is supported at respective lower portions of right and left pair of fork pipes 12a, which constitute the front fork 12, via an axle shaft 2a. The front fork 12 has an upper end portion where a handlebar 19 for steering is secured.

A pivot shaft 20 is inserted through the right and left pivot frames 17 in a vehicle width direction and secured. The swing arm 13 is turnably supported by the pivot shaft 20. The rear wheel 3 is supported by the rear end portion of the swing arm 13 via an axle shaft 3a.

The engine 11 is a four-stroke engine with a single cylinder. The engine 11 includes a crankcase 21 and a cylinder portion 22 extending upward from an upper surface on a front portion of the crankcase 21.

The cylinder portion 22 includes a cylinder block 22a combined to an upper surface of the crankcase 21, a cylinder head 22b combined to the cylinder block 22a, and a cylinder head cover 22c covering an upper portion of the cylinder head 22b.

The cylinder portion 22 tilts rearward, and an axis 22d of the cylinder portion 22 also tilts rearward.

The engine 11 is supported by front upper portions and front lower portions of the right and left pivot frames 17 and lower end portions of the right and left down frames 18. The crankcase 21 is positioned below the right and left main frames 16 and ahead of the right and left pivot frames 17. The cylinder head 22b overlaps rear portions of the right and left main frames 16 in side view.

A fuel tank 23 is disposed ahead of the seat 38 and above the rear portions of the right and left main frames 16, and above the right and left pivot frames 17.

Between the head tube 15 and the fuel tank 23, an intake device 24 that supplies an air to the engine 11 is disposed.

The intake device 24 includes an air cleaner 25, a right and left pair of ducts 26, and a throttle body 27.

The air cleaner 25 is disposed between the head tube 15 and the fuel tank 23 ahead of the fuel tank 23. The air cleaner 25 purifies the air. The right and left ducts 26 extend rearward from a front surface of the motorcycle 10 to be coupled to the air cleaner 25. The throttle body 27 is coupled to an air intake opening 22e on a front surface of the cylinder head 22b. The throttle body 27 has a front end portion where an air suction port 27a is disposed.

The cylinder head 22b has a rear surface with an exhaust outlet (not illustrated) to which an exhaust pipe 28 is coupled. The exhaust pipe 28 extends rearward passing below the seat 38 to be coupled to a muffler 29 disposed above the rear wheel 3. That is, the engine 11 is, what is called a rear exhaust type, which takes in an air from the front surface of the cylinder head 22b and exhausts the air from the rear surface of the cylinder head 22b.

Between the swing arm 13 and the body frame 10A, a rear cushion unit 30 is bridged.

A right and left pair of stays 17a that extend rearward from the right and left respective pivot frames 17 include a right and left pair of respective steps 31 on which a rider puts his feet.

The vehicle body cover 10B includes a front cowl 32, a right and left pair of center side covers 33, an undercover 34, an upper cover 35, and a rear cover 36.

The front cowl 32 covers an upper portion of the head tube 15 and the front fork 12 from a front. The right and left center side covers 33 covers the engine 11 from sides. The undercover 34 covers the engine 11 from a lower side. The upper cover 35 covers between the air cleaner 25 and the fuel tank 23. The rear cover 36 covers the rear portion of the body frame 10A.

The front wheel 2 is covered with a front fender 37 from an upper side. The front fender 37 is secured to the front fork 12.

Figure 2:
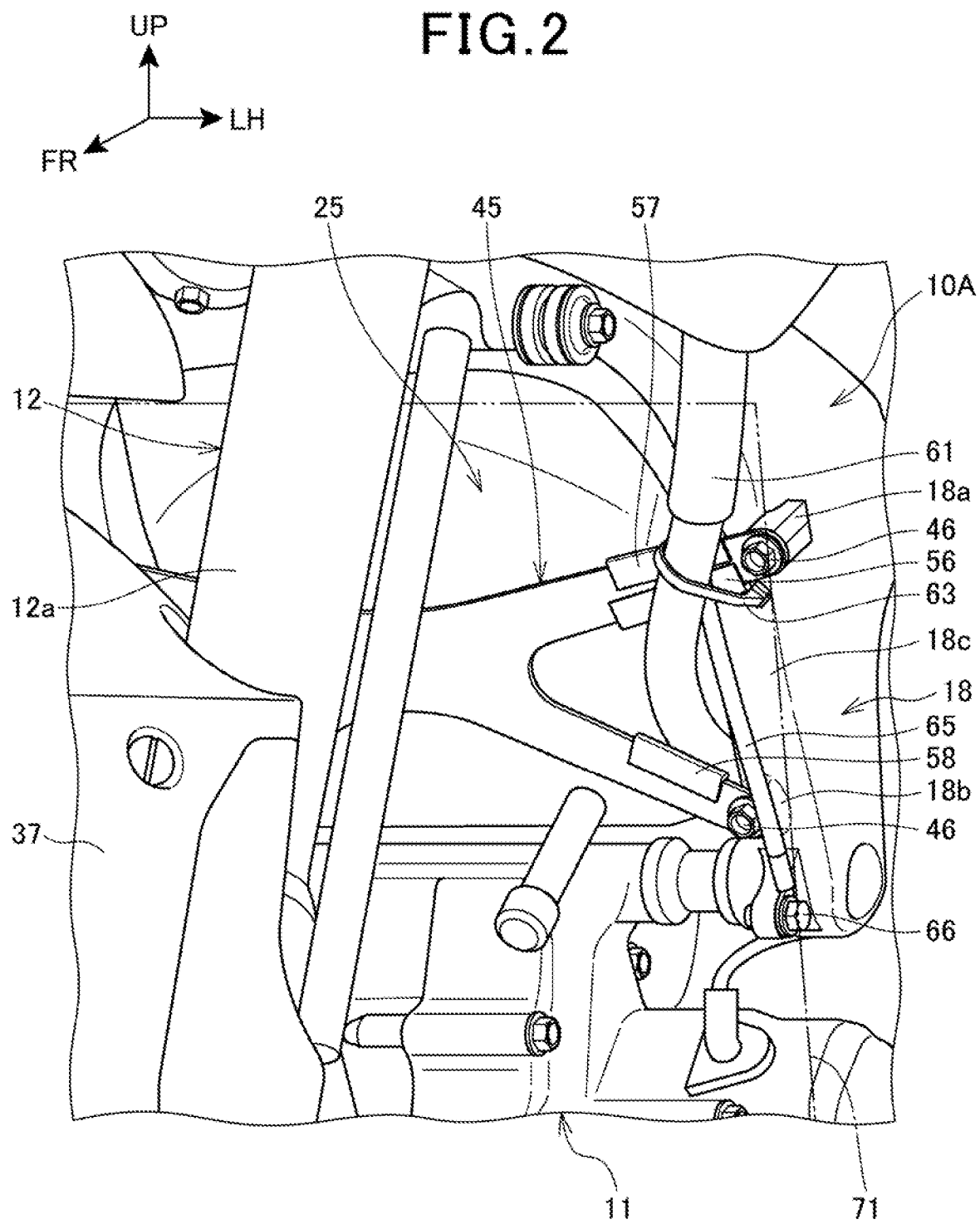
FIG. 2 is a perspective view (first embodiment) illustrating a body frame and a peripheral area of the body frame.

FIG. 2 is a perspective view (first embodiment) illustrating the body frame 10A and a peripheral area of the body frame 10A.

In FIG. 2, the front cowl 32 and the center side covers 33 illustrated in FIG. 1 are omitted.

A cross member 45 for reinforcement is bridged over the right and left down frames 18. The cross member 45 is in a plate shape. The cross member 45 is fastened onto respective sides of front surfaces 18c of the right and left down frames 18 with a plurality of bolts 46. The cross member 45 constitutes a part of the body frame 10A.

A radiator 71 is disposed ahead with respect to the cross member 45, and the air cleaner 25 is disposed behind with respect to the cross member 45.

Conventionally, a reinforcing member made of a pipe has been bridged over right and left portions of a body frame in order to enhance a rigidity of the body frame. That is, each of end portions on the right and left of the reinforcing member has been coupled to the body frame at each single position. As a result, when a torsion force acts on the body frame, the reinforcing member comparatively easily falls with respect to the body frame, thereby causing twisting in the body frame.

In contrast to this, in this embodiment, the cross member 45 is used not only to simply increase a rigidity of the body frame, but to deal with the torsion force applied to the body frame 10A, for example, especially when braking is performed while the motorcycle 10 (see FIG. 1) is turning. The cross member 45 has respective portions on the right side and the left side that are fastened to the body frame 10A at a plurality of positions (respective two positions here) to enhance a torsional rigidity of the body frame 10A. As a result, the twisting of the body frame 10A can be reduced.

Figure 3:
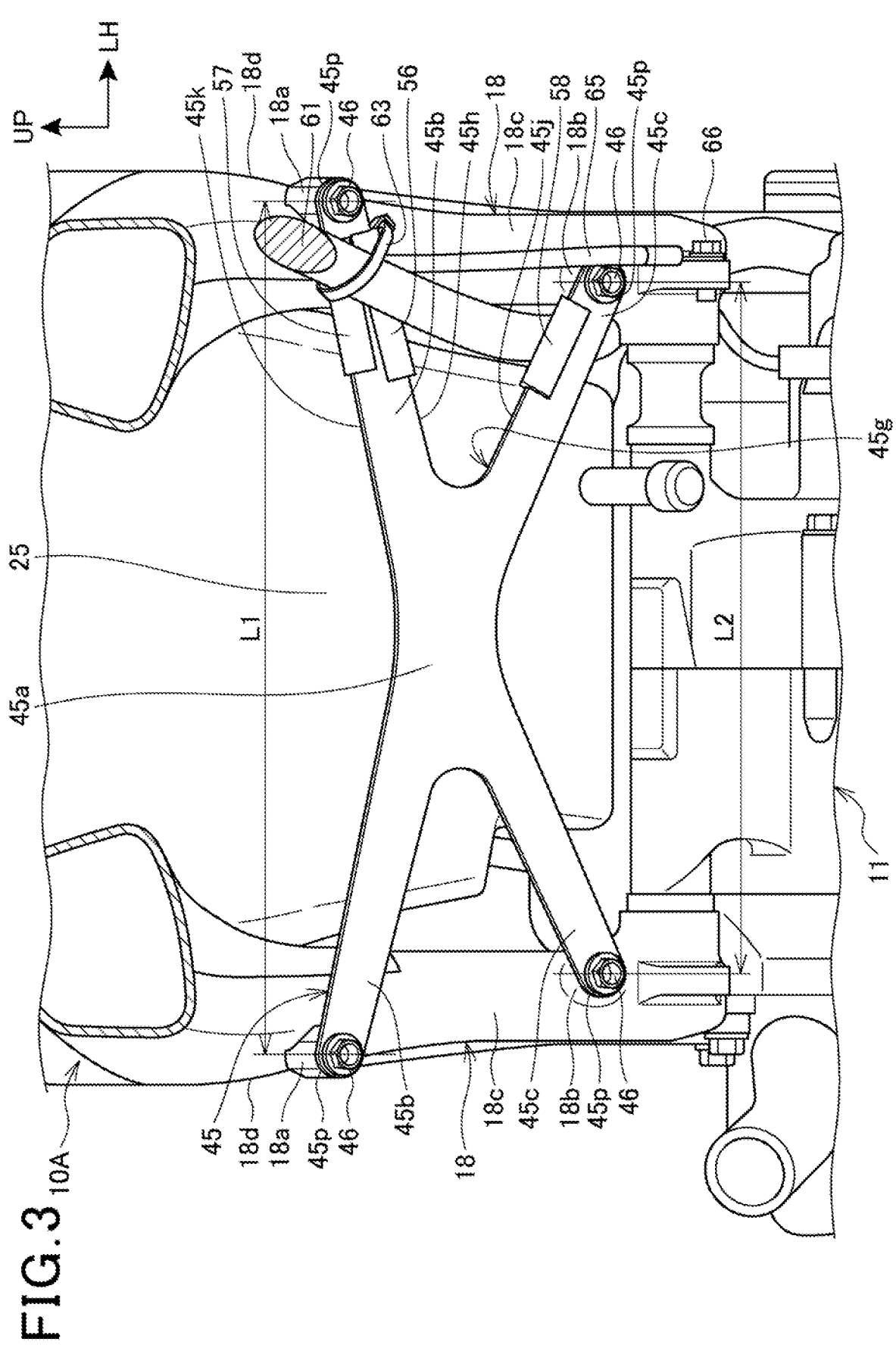
FIG. 3 is a front view (first embodiment) illustrating a cross member and a peripheral area of the cross member.
Figure 4:
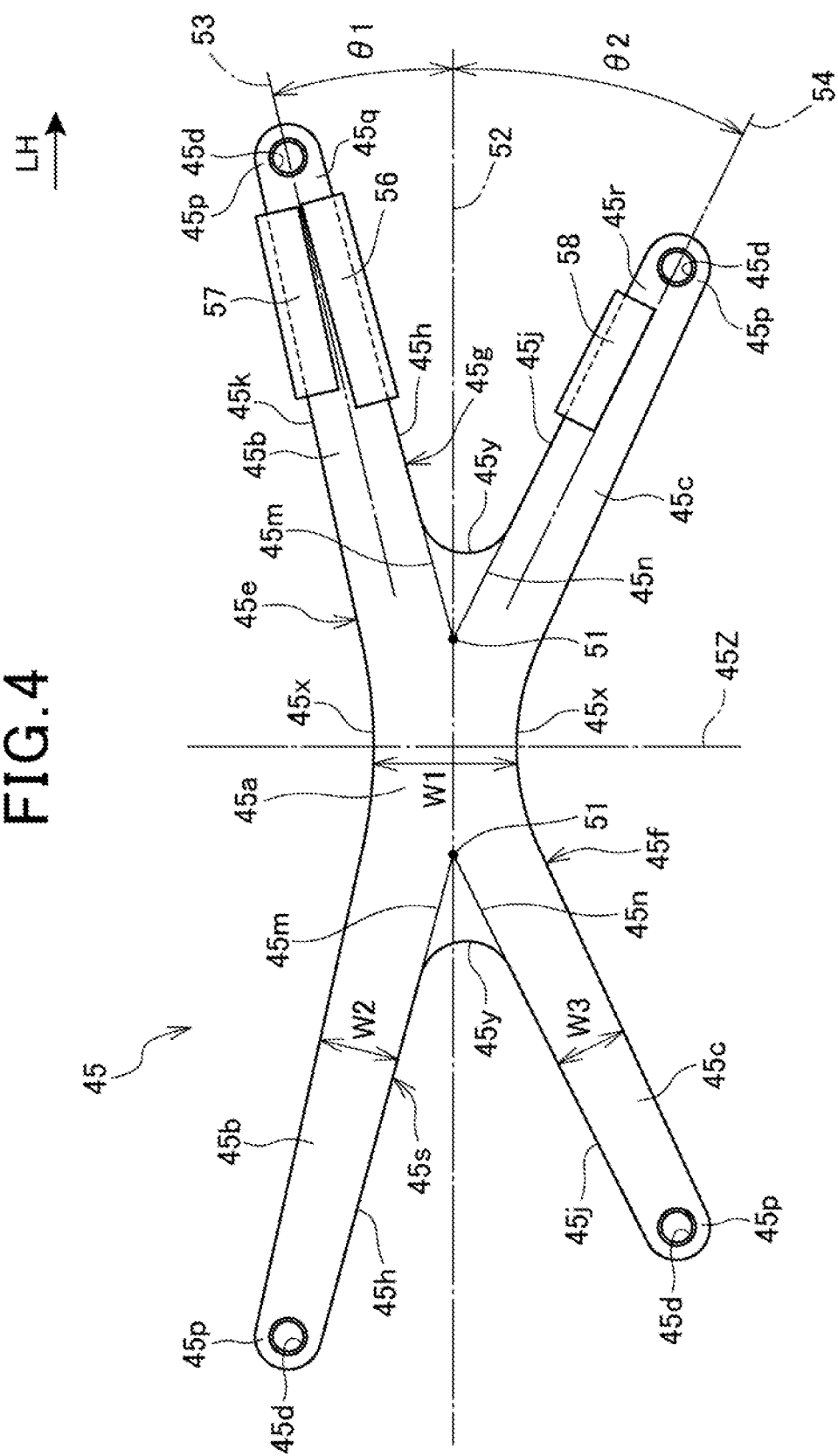
FIG. 4 is a front view (first embodiment) illustrating the cross member.

FIG. 3 is a front view (first embodiment) illustrating the cross member 45 and a peripheral area of the cross member 45. FIG. 4 is a front view (first embodiment) illustrating the cross member 45.

As illustrated in FIG. 3, the cross member 45 is fastened to upper supporting bosses 18a and lower supporting bosses 18b disposed on the right and left respective down frames 18.

The cross member 45 is formed out of a flat plate. The cross member 45 is formed into an X shape. The preferred materials are resin, a composite material such as FRP and CFRP, or a light metal such as aluminum, magnesium, and titanium, and their alloy.

The right and left down frames 18 have the respective lower end portions supporting the engine 11.

As illustrated in FIG. 4, the cross member 45 forms a symmetrical shape with respect to a center line 45Z.

The cross member 45 includes a wide-width portion 45a constituting a center portion, and an upper arm portion 45b and a lower arm portion 45c rightwardly and leftwardly splitting into respective fork shapes from the wide-width portion 45a and extend. The right and left upper arm portion 45b has a total length longer than that of the right and left lower arm portion 45c.

While the wide-width portion 45a has a vertical width that differs depending on a position, for example, the vertical width at the position in the drawing is represented as W1. While the upper arm portion 45b and the lower arm portion 45c have widths that differ depending on positions, for example, the widths at the positions in the drawing are represented as W2 and W3. The width W1 of the wide-width portion 45a is larger than the width W2 of the upper arm portion 45b and larger than the width W3 of the lower arm portion 45c (W1>W2, W1>W3).

The right and left upper arm portions 45b and the right and left lower arm portions 45c have respective distal end portions at which mounted portions 45p mounted to the right and left down frames 18 (see FIG. 3). The respective mounted portions 45p have bolt insertion holes 45d through which the bolts 46 (see FIG. 3) passes.

Between the right and left upper arm portions 45b, between the right and left lower arm portions 45c, between the left side upper arm portion 45b and the left side lower arm portion 45c, and between the right side upper arm portion 45b and the right side lower arm portion 45c, an upper cut-out portion 45e, a lower cut-out portion 45f, a left cut-out portion 45g, and a right cut-out portion 45s are respectively made. The cut-out portions 45e, 45f, 45g, and 45s have respective corner portions 45x and 45y that are formed into arc shapes.

Extended lines 45m of lower end surfaces 45h of the upper arm portions 45b in the left cut-out portion 45g and the right cut-out portion 45s intersect with extended lines 45n of upper end surfaces 45j of the lower arm portions 45c at points 51. Reference Sign 52 denotes a cross member center line extending through the right and left points 51 in a vehicle width direction.

Reference Sign 53 denotes an upper arm center line passing through a center of the width of the upper arm portion 45b. Reference Sign 54 denotes a lower arm center line passing through a center of the width of the lower arm portion 45c.

The cross member center line 52 and the lower arm center line 54 form an angle θ2. The angle θ2 is greater than or equal to an angle 61 formed by the cross member center line 52 and the upper arm center line 53 (θ2>θ1).

This is for coupling the cross member 45 to, for example, the right and left down frames 18 with the right and left upper arm portions 45b and to provide a structure that supports the right and left upper arm portion 45b with the right and left lower arm portion 45c. This structure causes especially the right and left lower arm portions 45c of the right and left upper arm portions 45b and the right and left lower arm portions 45c to serve as a beam. This ensures reducing the twisting of the body frame 10A (see FIG. 3) on a surface including the cross member 45.

In FIG. 3, an interval between the right and left upper supporting bosses 18a, to which the respective distal end portions (the mounted portions 45p (see FIG. 4)) of the right and left upper arm portion 45b are fastened, is represented as L1. An interval between the right and left lower supporting bosses 18b, to which the respective distal end portions (the mounted portions 45p (see FIG. 4)) of the right and left lower arm portion 45c, is represented as L2. The interval L1 is wider than the interval L2 (L1>L2).

The upper supporting boss 18a is disposed near an outer side in the vehicle width direction with respect to a center in the vehicle width direction on the front surface 18c of the down frame 18. Furthermore, the upper supporting boss 18a projects outward with respect to an outer surface 18d of the down frame 18.

The lower supporting boss 18b is disposed near an inner side in the vehicle width direction with respect to the center in the vehicle width direction of the front surface 18c of the down frame 18.

As described above, the interval L1 between the right and left upper supporting bosses 18a and the interval L2 between the right and left lower supporting bosses 18b are made different; therefore, when the torsion force acts on the body frame 10A, the cross member 45 can restrict the upper supporting bosses 18a and the lower supporting bosses 18b from simultaneously deforming in a different manner. In view of this, it is possible to reduce the twisting of the body frame 10A along the surface including the cross member 45.

In FIG. 3 and FIG. 4, the upper arm portion 45b on one side (left side) in the vehicle width direction of the cross member 45 has a side of the lower end surface 45h and a side of an upper end surface 45k on which respective protective members 56 and 57 are mounted. The lower arm portion 45c on the one side (left side) in the vehicle width direction of the cross member 45 has a side of the upper end surface 45j on which a protective member 58 is mounted.

The protective members 56, 57, and 58 are made of resin or rubber. The protective member 56 covers both surfaces (a front surface 45q and a rear surface (not illustrated)) and the lower end surface 45h of the upper arm portion 45b. The protective member 57 covers both surfaces (the front surface 45q and the rear surface (not illustrated)) and the upper end surface 45k of the upper arm portion 45b. The protective member 58 covers both surfaces (a front surface 45r and a rear surface (not illustrated)) and the upper end surface 45j of the lower arm portion 45c.

The protective members 56 and 58 protect a main wire harness 61 such that the main wire harness 61 does not directly touch the lower end surface 45h and the upper end surface 45j of the cross member 45 when the main wire harness 61 is passed through the left cut-out portion 45g.

The protective members 56 and 57 protect a cable tie 63 such that the cable tie 63 does not directly touch the lower end surface 45h and the upper end surface 45k of the cross member 45 when the cable tie 63 secures the main wire harness 61 to the upper arm portion 45b.

The cable tie 63 also secures a wire harness for grounding 65 branched from the main wire harness 61 together with the main wire harness 61 to the upper arm portion 45b. The wire harness for grounding 65 has a distal end portion fastened to the down frame 18 on one side (left side) with a bolt 66 so as to be electrically coupled to the body frame 10A.

As illustrated in FIG. 4 above, the upper cut-out portion 45e, the lower cut-out portion 45f, the left cut-out portion 45g, and the right cut-out portion 45s as a cut-out portion are formed in the cross member 45 between a plurality of the mounted portions 45p.

This configuration ensures reducing a weight of the cross member 45 while enhancing the rigidity such as a flexural rigidity, a torsional rigidity, or the like of the body frame 10A.

The corner portions 45x and 45y of the upper cut-out portion 45e, the lower cut-out portion 45f, the left cut-out portion 45g, and the right cut-out portion 45s being formed into the arc shapes ensures reducing stress concentration at the corner portions 45x and 45y to increase a strength of the cross member 45.

The cross member 45 includes the right and left pair of upper arm portions 45b and the right and left pair of lower arm portions 45c as a plurality of arm portions including a plurality of the mounted portions 45p, and the wide-width portion 45a to which the right and left upper arm portions 45b and the right and left lower arm portions 45c are coupled. The wide-width portion 45a is formed wider than the right and left upper arm portions 45b and the right and left lower arm portions 45c in front view.

This configuration ensures protecting a vehicle constituting member (specifically, the air cleaner 25) disposed at rear of the wide-width portion 45a from a scatter and the like.

As illustrated in FIG. 3 and FIG. 4, the cross member 45 is disposed to be removable/attachable from/to the down frame 18, and has pairs of the upper cut-out portions 45e, the lower cut-out portions 45f, the left cut-out portions 45g, and the right cut-out portions 45s at least at opposed positions. The main wire harness 61 and the wire harness for grounding 65 are passed through only the left cut-out portion 45g on one side of the pair of left cut-out portion 45g and right cut-out portion 45s.

This configuration ensures removing and attaching the cross member 45 without removing the main wire harness 61 and the wire harness for grounding 65.

Figure 5:
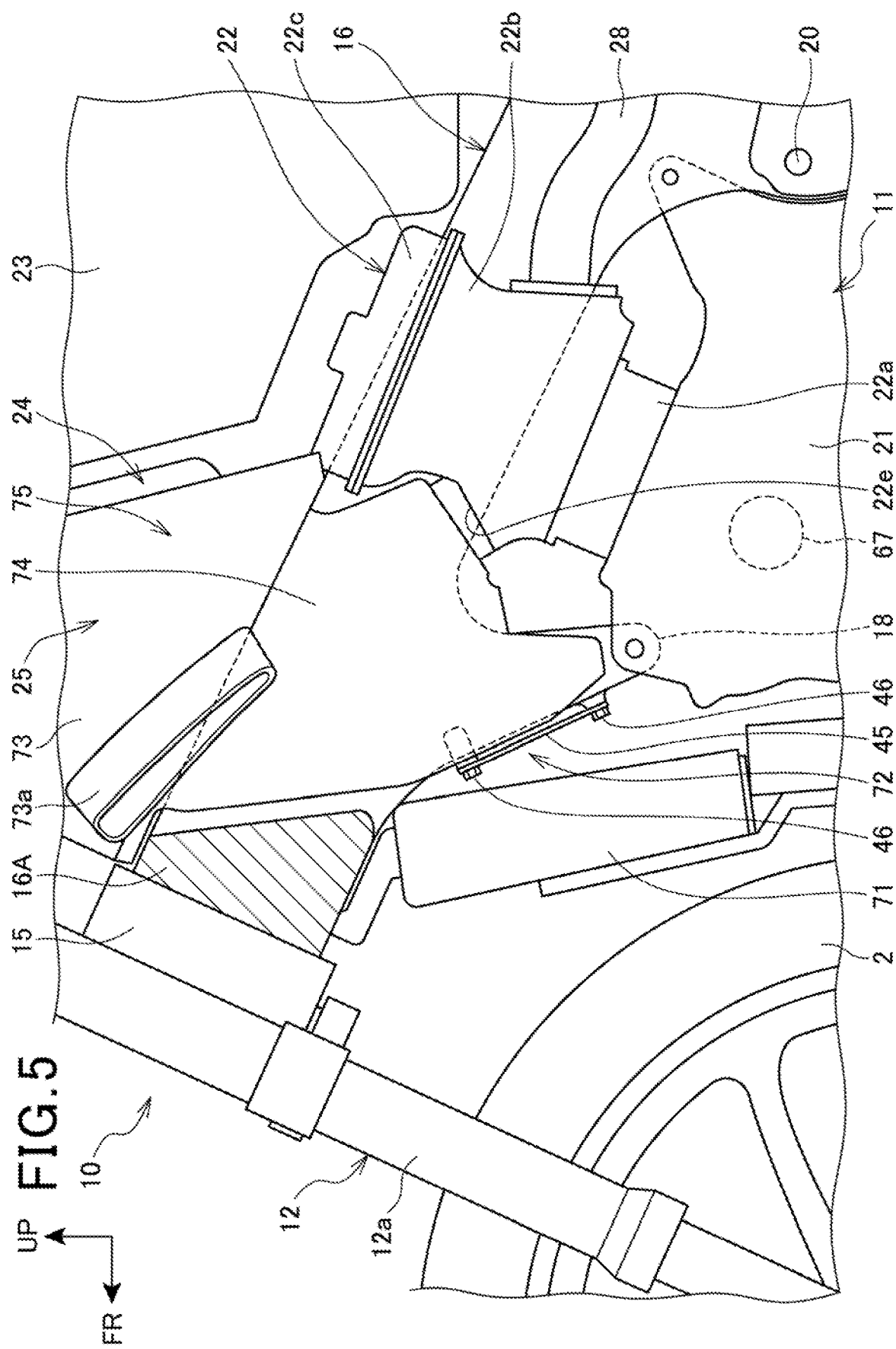
FIG. 5 is a left side view (first embodiment) illustrating a vehicle-body front portion.

FIG. 5 is a left side view (first embodiment) illustrating a vehicle-body front part.

For the main frame 16, a cross-sectional surface is illustrated and only a connecting portion 16A of the right and left main frames 16 to the head tube 15 and the main frame 16 on the other side (right side) are illustrated. For the down frame 18, only the down frame 18 on the other side (right side) is illustrated.

A crankshaft 67 that extends in the vehicle width direction is rotatably supported in the crankcase 21 of the engine 11.

The radiator 71 is disposed ahead of the cross member 45. The air cleaner 25 is closely disposed at rear of the cross member 45. Since the cross member 45 is in a flat plate shape, the cross member 45 can be disposed in a narrow space 72 between the radiator 71 and the air cleaner 25, and only the cross member 45 can be removed and attached from sides (vehicle width direction) without removing and attaching other components. That is, a space on the vehicle occupied by the cross member 45 can be decreased, thereby ensuring achieving the size reduced and compact motorcycle 10.

The air cleaner 25 includes an air cleaner case 75, which is divided into an upper side and a lower side, made of an upper case 73 and a lower case 74.

The upper case 73 includes a right and left pair of suction ports 73a coupled to a right and left pair of ducts (not illustrated). The lower case 74 is positioned between the right and left down frames 18 and is closely disposed at rear of the cross member 45.

Disposing the cross member 45 ahead of the air cleaner case 75 ensures flowing a part of warmed discharged air from the radiator 71 downward with respect to the air cleaner case 75 due to the cross member 45 that forwardly inclines, thereby ensuring making it hard for the part of warmed discharged air to hit the air cleaner case 75. This ensures reducing temperature rise of the air in the air cleaner case 75, thereby ensuring enhancing a charging efficiency of the air supplied to the engine 11 from the air cleaner 25.

Figure 6:
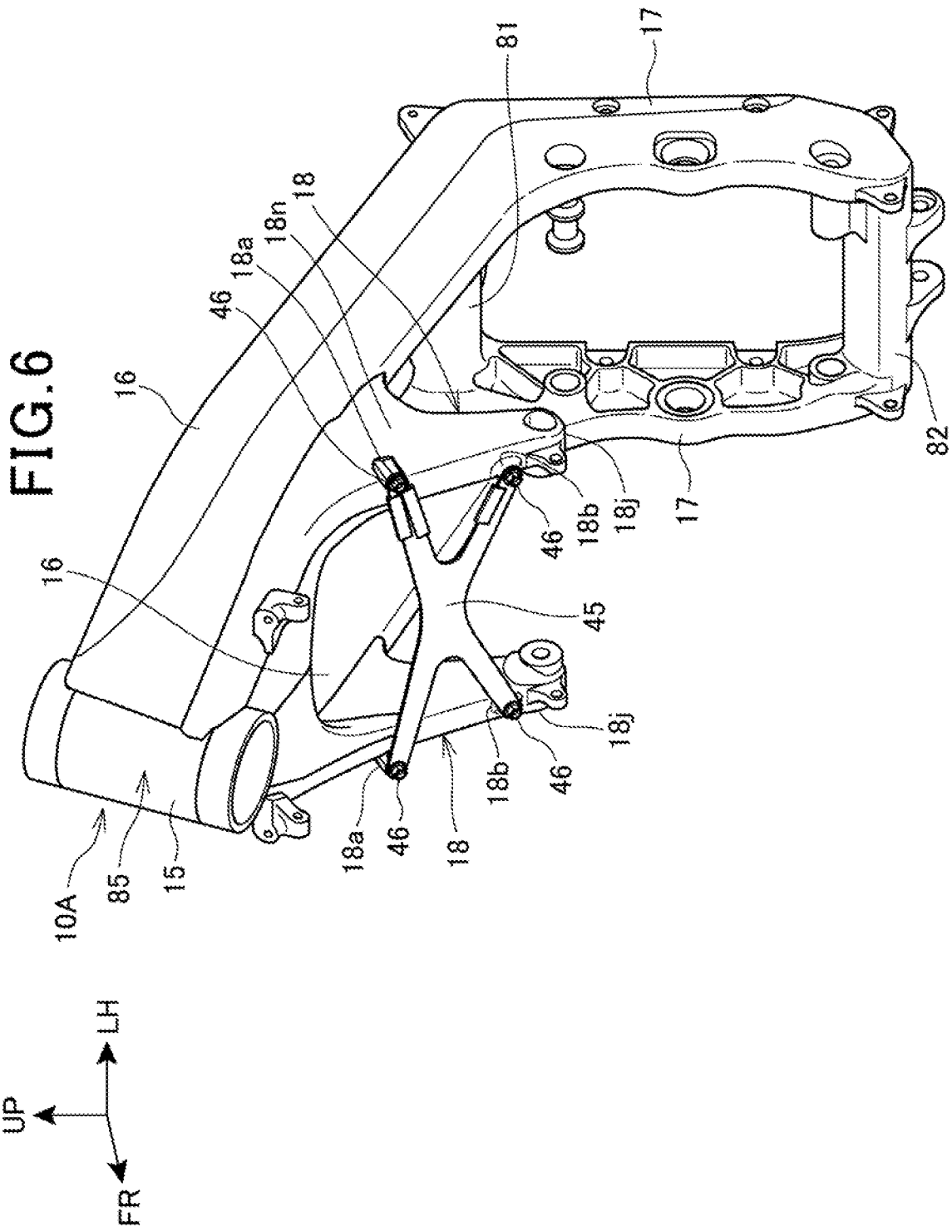
FIG. 6 is a perspective view (first embodiment) illustrating the body frame.
Figure 7:
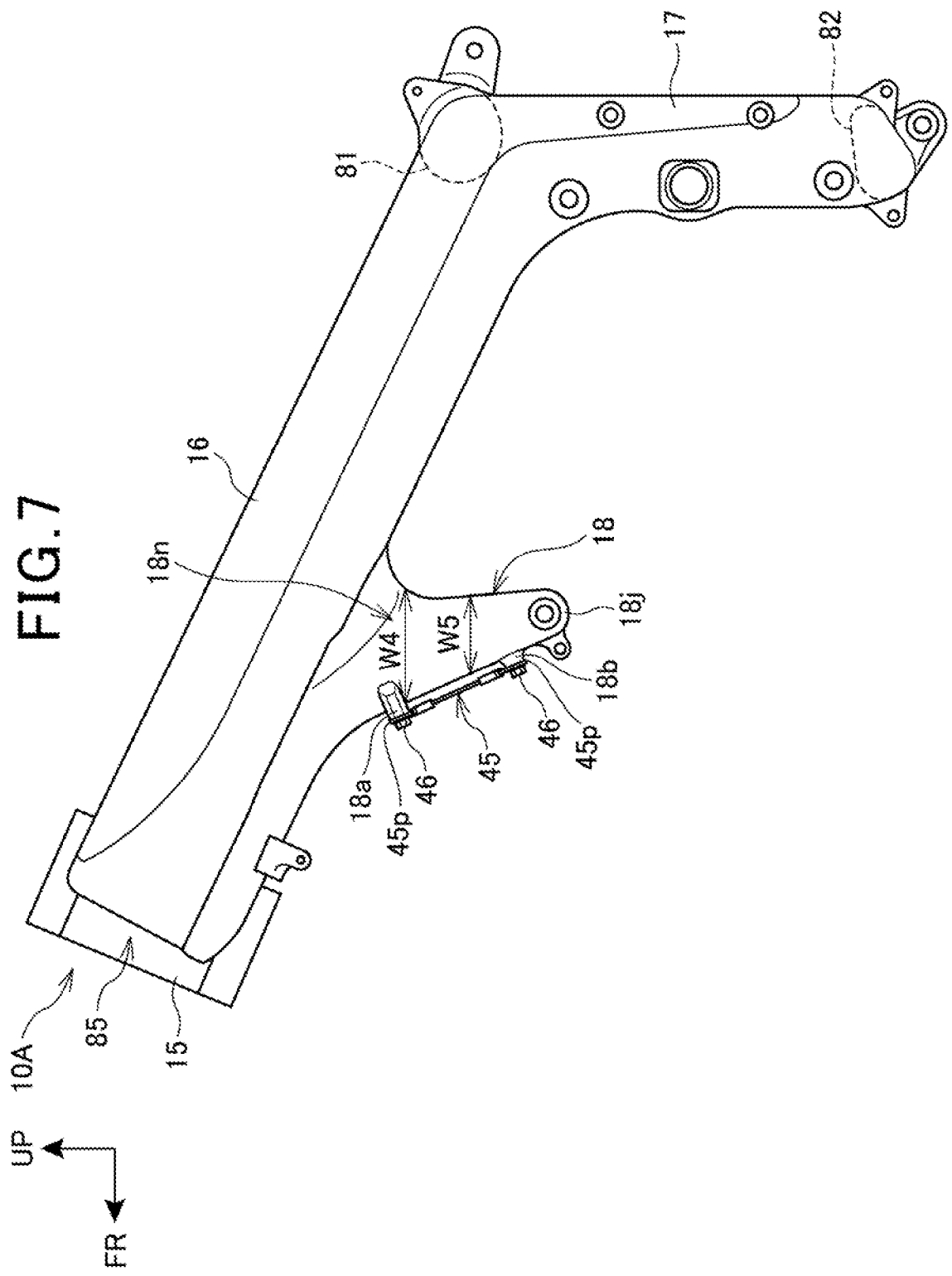
FIG. 7 is a left side view (first embodiment) illustrating the body frame.

FIG. 6 is a perspective view (first embodiment) illustrating the body frame 10A. FIG. 7 is a left side view (first embodiment) illustrating the body frame 10A.

As illustrated in FIG. 6 and FIG. 7, the respective upper supporting bosses 18a of the right and left down frames 18 are disposed in enlarged width portions 18n whose widths in a front-rear direction in upper portions of the right and left down frames 18, that is, near root portions of the main frames 16.

In FIG. 7, in a side view of the down frame 18, the width in the front-rear direction of the down frame 18 gradually increases toward the main frame 16 from the lower end. A width W4 in the front-rear direction of the enlarged width portion 18n of the down frame 18 is greater than a width W5 in the front-rear direction at a position below the enlarged width portion 18n (W4>W5).

The respective lower supporting bosses 18b of the right and left down frames 18 are disposed in engine supporting portions 18j at distal end portions of the right and left down frames 18.

As illustrated in FIG. 4, FIG. 6, and FIG. 7, the right and left upper arm portions 45b (specifically, the mounted portions 45p of the upper arm portions 45b) of the cross member 45 are mounted on the enlarged width portions 18n of the right and left down frames 18. The right and left lower arm portions 45c (specifically, the mounted portions 45p of the lower arm portions 45c) of the cross member 45 are mounted on the engine supporting portions 18j at the distal end portions of the right and left down frames 18.

In FIG. 6 and FIG. 7, the body frame 10A includes an upper cross member 81 and a lower cross member 82. The upper cross member 81 couples respective rear end portions of the right and left main frames 16. The lower cross member 82 couples respective lower end portions of the right and left pivot frames 17.

In the body frame 10A, the head tube 15, the right and left main frames 16, the right and left pivot frames 17, the right and left down frames 18, the upper cross member 81, and the lower cross member 82 configure a main frame portion 85. The main frame portion 85 forms an integrated structure.

In FIG. 1, FIG. 6, and FIG. 7, for the main frame portion 85, an external force is transmitted from the front wheel 2 side to the head tube 15 via the front fork 12 and from the rear wheel 3 side to the right and left pivot frames 17 via the swing arm 13 and the pivot shaft 20.

In the main frame portion 85, the right and left main frames 16 are the longest members and are portions where the twisting is easily generated by the above-described external force. The cross member 45 ensures reducing the twisting in the right and left main frames 16 and around the right and left main frames 16 described above.

The cross member 45 is mounted to the right and left down frames 18 projecting downward from the right and left respective main frames 16.

The cross member 45 is disposed at positions far apart from the main frame 16 on the right and left down frames 18. This further increases an effect to reduce the twisting of the main frame 16 when a torsion force in a rolling direction acts on the right and left main frames 16 compared with the case in which the cross member 45 is disposed at a position close to the main frames 16 on the right and left down frames 18.

The above-described rolling direction is a direction of turning about an axis extending in the front-rear direction between the right and left main frames 16 or an axis extending in a longitudinal direction of the main frame 16 in side view between the right and left main frames 16.

As described in FIG. 3, FIG. 6, and FIG. 7 above, the mounted portions 45p are disposed at a plurality of positions on the right and left of the cross member 45. The mounted portions 45p that are disposed in the upper side have the wider interval mounted on the right and left down frames 18 in the vehicle width direction, that is, the interval L1 is wider than the interval L2 (L1>L2). Therefore, making the intervals between the mounted portions 45p in the vehicle width direction different in the vertical direction ensures restricting the mounted portions 45p on the upper side (upper supporting boss 18a side) and the mounted portions 45p on the lower side (lower supporting boss 18b side) of the cross member 45 from simultaneously deforming in a different manner when the torsion force acts on the body frame 10A, thereby ensuring the reduced twisting of the body frame 10A.

Figure 8:
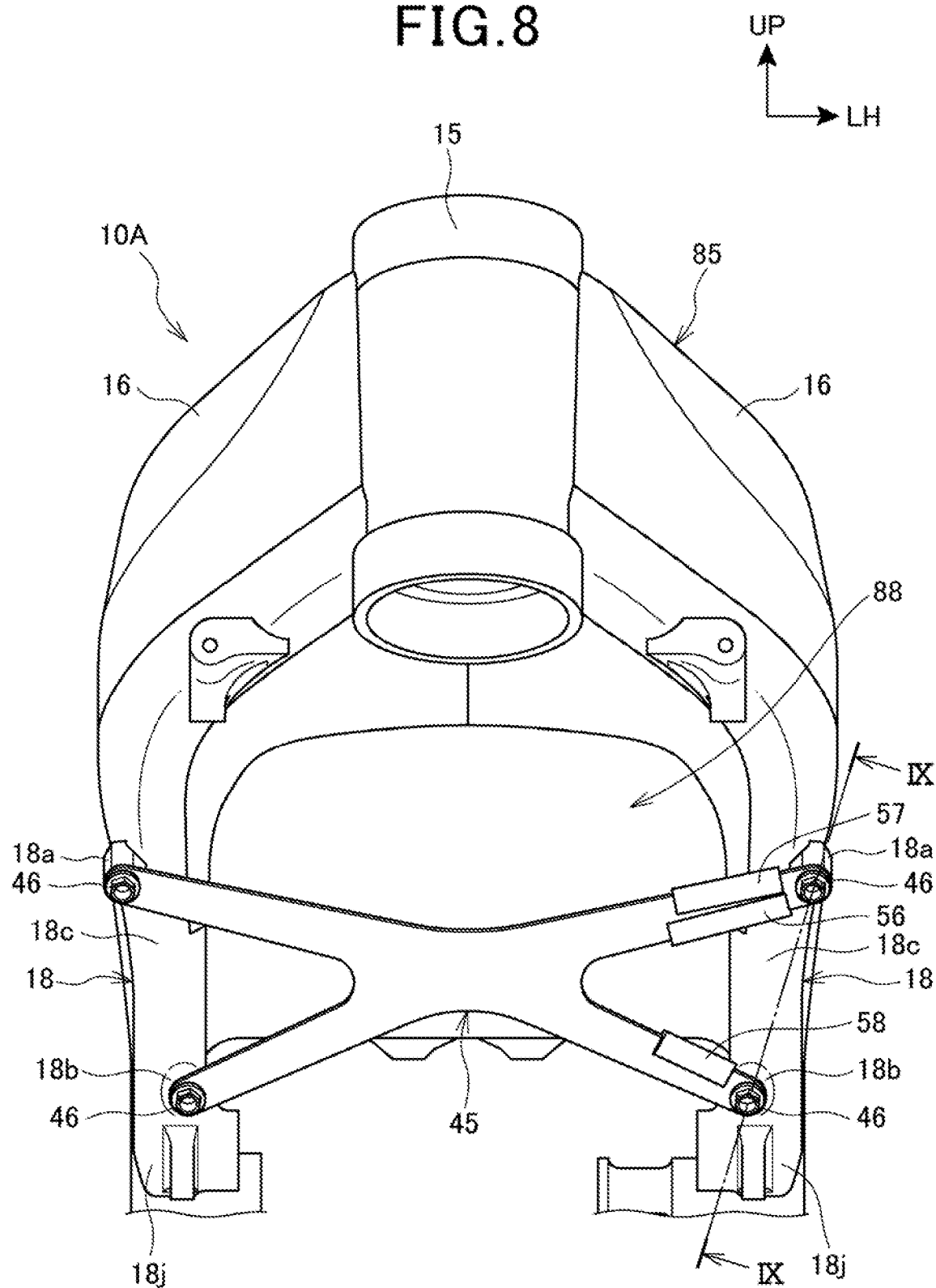
FIG. 8 is a front view (first embodiment) illustrating an upper portion of the body frame.

FIG. 8 is a front view (first embodiment) illustrating an upper portion of the body frame 10A.

Coupling the right and left down frames 18 using the cross member 45 ensures forming a closed space 88 in the main frame portion 85 using the right and left main frames 16, the right and left down frames 18, and the cross member 45. This improves the rigidity of the main frame portion 85, thereby ensuring the reduced deformation of the whole main frame portion 85.

It is also possible to achieve the reduced weight of the main frame portion 85 by thinning thicknesses and decreasing section moduli of the respective portions of the main frame portion 85 while ensuring rigidity of the main frame portion 85.

Figure 9:
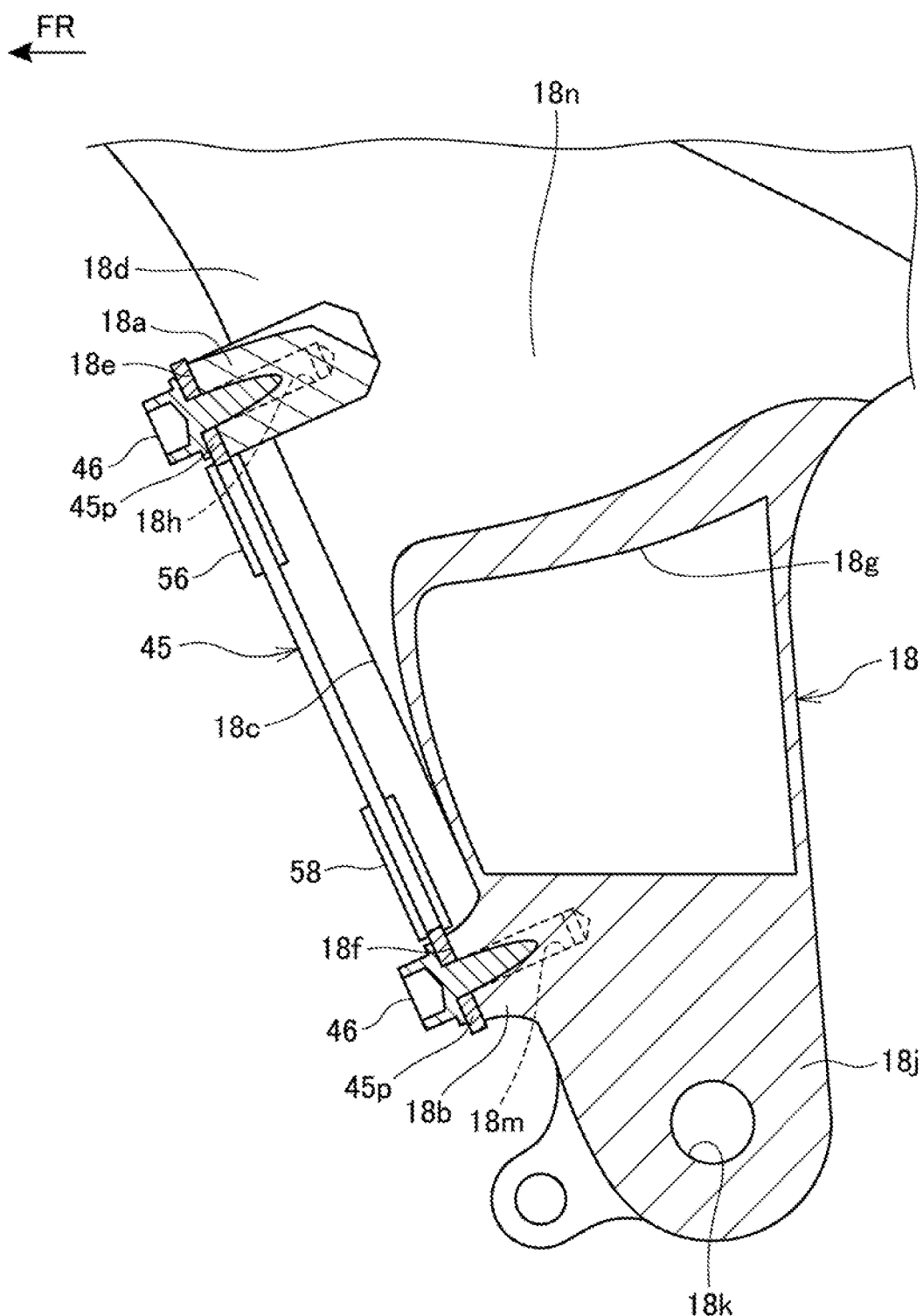
FIG. 9 is a cross-sectional view (first embodiment) taken along a line IX-IX in FIG. 8.

FIG. 9 is a cross-sectional view (first embodiment) taken along a line IX-IX in FIG. 8.

The upper supporting boss 18a and the lower supporting boss 18b have identical or approximately identical amount of projections from the front surface 18c of the down frame 18; therefore, the cross member 45 mounted on respective end surfaces 18e and 18f of the upper supporting boss 18a and the lower supporting boss 18b with the plurality of bolts 46 is disposed along the front surface 18c of the down frame 18.

The right and left down frames 18 have hollow portions 18g.

Since the upper supporting boss 18a projects to the side from the outer surface 18d of the down frame 18 (see also FIG. 8), a length of the screw hole 18h can be ensured without a screw hole 18h, into which the bolt 46 is screwed, passing through the hollow portion 18g, thereby ensuring the fastening power of the bolt 46.

The engine supporting portions 18*j* disposed at the distal end portions of the right and left down frames 18 are formed solid and include bolt insertion holes 18*k* through which bolts (not illustrated) are inserted to support the engine 11 (see FIG. 1).

The lower supporting boss 18*b* is formed at the engine supporting portion 18*j* and has a screw hole 18*m* into which the bolt 46 is screwed. The lower supporting boss 18*b* is formed on the solid engine supporting portion 18*j*; therefore, a length of the screw hole 18*m* can be ensured, thereby ensuring the fastening power of the bolt 46.

The upper supporting boss 18*a* is disposed at the enlarged width portion 18*n*. The lower supporting boss 18*b* is disposed at the solid engine supporting portion 18*j*. The enlarged width portion 18*n* and the engine supporting portion 18*j* are both portions high in strength among each of the portions of the down frame 18. Therefore, the cross member 45 is strongly secured to the down frame 18.

As described in FIG. 1, FIG. 3, FIG. 4, and FIG. 5 above, the motorcycle 10 as a saddle riding vehicle having a body frame reinforcing structure includes the right and left pair of down frames 18 that supports the engine 11 in the body frame 10A. The right and left down frames 18 are coupled using the cross member 45.

The cross member 45 has the plurality of mounted portions 45*p* that are mounted on the right and left respective down frames 18.

This configuration ensures enhancing the rigidity (in addition to flexural rigidity, torsional rigidity) of the body frame 10A by receiving the external force, which is applied to the body frame 10A, on a surface. Compared with the conventional structure in which each one position of both ends of the cross member is mounted on each of the down frames, this embodiment ensures reducing the increase in the vehicle weight.

As illustrated in FIG. 2 and FIG. 3, the cross member 45 includes the upper arm portion 45*b* and the lower arm portion 45*c* as a harness mounting portion to which the main wire harness 61 and the wire harness for grounding 65 as a wire harness are mounted. Through the upper cut-out portion 45*e*, the lower cut-out portion 45*f*, the left cut-out portion 45*g*, and the right cut-out portion 45*s* as a cut-out portion (left cut-out portion 45*g*, here), the main wire harness 61 and the wire harness for grounding 65 are passed.

This configuration ensures compactly piping and reliably positioning the main wire harness 61 and the wire harness for grounding 65.

As illustrated in FIG. 7 and FIG. 9, the plurality of mounted portions 45*p* are mounted on the enlarged width portion 18*n* and the engine supporting portion 18*j* that are disposed in the down frame 18 and both high in strength and rigidity; therefore, the cross member 45 can be further strongly mounted on the down frame 18.

As illustrated in FIG. 3 and FIG. 5, the plurality of mounted portions 45*p* are fastened to the down frame 18 from the vehicle front side.

This configuration ensures further easily replacing the cross member with a cross member having another shape or another material for the purpose of, for example, adjusting the rigidity of the body frame 10A.

Second Embodiment

FIG. 10 is a front view illustrating a cross member 91 of a second embodiment. The cross member 91 is made of a flat plate. The cross member 91 is integrally configured of a straight line portion 91*a* and a right and left pair of bent portions 91*b* that bend and extend from both respective ends of the straight line portion 91*a*. The cross member 91 forms a symmetrical shape with respect to a center line 91Z.

A portion surrounded by the straight line portion 91*a* and the right and left bent portions 91*b* of the cross member 91 is a cut-out portion 91*x*.

In FIG. 3 and FIG. 10, the cross member 91 is fastened to the upper supporting bosses 18*a* and the lower supporting bosses 18*b* on the right and left respective down frames 18 with the plurality of bolts 46.

The cross member 91 has mounted portions 91*d*, which is mounted to the upper supporting bosses 18*a* of the right and left down frames 18, at right and left corner portions. The respective mounted portions 91*d* have bolt insertion holes 91*f* into which the bolts 46 are inserted.

The cross member 91 includes mounted portions 91*c*, which is mounted on the lower supporting bosses 18*b* of the right and left down frames 18, at distal end portions of the right and left bent portions 91*b*. The respective mounted portions 91*c* have bolt insertion holes 91*e* into which the bolts 46 are inserted.

In FIG. 10, while the two bolt insertion holes 91*e* and 91*f* are identical, the reference numerals are made different in order for identification here. A pair of the bolt insertion holes 91*f* are disposed on an extended line of the straight line portion 91*a*.

A straight line 93 that passes the two bolt insertion holes 91*e* and 91*f* and a straight line 94 that passes the pair of bolt insertion holes 91*f* form an angle 63 that is smaller than 90 degrees (θ3<90 degrees).

A pair of corner portions 91*g* formed between the straight line portion 91*a* and the right and left bent portions 91*b* are formed into arc shapes. Forming the pair of corner portions 91*g* into the arc shapes ensures reducing the stress concentration.

An L-shaped protective member 96 is mounted so as to straddle across a lower end surface 91*h* side of an end in one side (left side) and an inner end surface 91*j* side of the bent portion 91*b* in one side (left side) of the straight line portion 91*a*.

The protective member 96 is made of resin or rubber. The protective member 96 covers both surfaces (a front surface 91*k* and a rear surface (not illustrated)) of the straight line portion 91*a* and the bent portions 91*b*, the lower end surface 91*h*, and the inner end surface 91*j*.

In FIG. 3 and FIG. 10, the protective member 96 protects the main wire harness 61 and the wire harness for grounding 65 when the main wire harness 61 and the wire harness for grounding 65 are passed through the cut-out portion 91*x*. That is, the main wire harness 61 and the wire harness for grounding 65 are caused to avoid directly touching the lower end surface 91*h* and the inner end surface 91*j* of the cross member 91.

In the end portion in one side (left side) and the bent portion 91*b* in one side (left side) of the straight line portion 91*a*, a protective member 97 is mounted on an upper end surface 91*m* side disposed on the straight line portion 91*a* and the bent portion 91*b*, and a protective member 98 is mounted on an outer end surface 91*n* side in the bent portion 91*b*.

The protective members 97 and 98 are made of resin or rubber. The protective member 97 covers both surfaces (the front surface 91*k* and the rear surface (not illustrated)) of the straight line portion 91*a* and the bent portions 91*b* and the upper end surface 91*m*. The protective member 98 covers both surfaces (the front surface 91k and the rear surface (not illustrated)) of the bent portion 91b and the outer end surface 91n.

The protective members 97 and 98 protect the cable tie 63 when the cable tie 63 secures the main wire harness 61 and the wire harness for grounding 65 to a corner portion of the cross member 91. That is, the cable tie 63 is caused to avoid directly touching the upper end surface 91m and the outer end surface 91n.

The straight line portion 91a and the bent portion 91b are harness mounting portions to which the main wire harness 61 and the wire harness for grounding 65 are mounted.

The above-described embodiment is given to merely illustrate an aspect of the present invention, and any modification and application are possible without departing from the spirit of the present invention.

For example, while in the above-described embodiment, the cross member is in the X shape, the configuration is not limited to this, and the cross member may be in a rectangular shape, a trapezoidal shape, a polygonal shape, or a shape similar to these shapes. In short, it is only necessary to include the plurality of mounted portions that can be mounted on the right and left respective down frames.

While the cross member is in the flat plate shape, the configuration is not limited to this, and unevenness, such as a reinforcing rib, may be disposed on the front surface. In this case, the unevenness may be provided only on the rear surface without providing the unevenness on the front surface of the cross member on which a travelling air and the discharged air from the radiator hit.

While in the cross member in the X shape, the wire harness and the wire harness for grounding are passed through the cut-out portion on the left side, the configuration is not limited to this, and the wire harness and the wire harness for grounding may be passed through the cut-out portion on the right side.

REFERENCE SIGNS LIST

10 . . . Motorcycle (saddle riding vehicle)
10A . . . Body frame
11 . . . Engine
18 . . . Down frame
18j . . . Engine supporting portion
18n . . . Enlarged width portion
45, 91 . . . Cross member
45a . . . Wide-width portion
45b . . . Upper arm portion (arm portion, harness mounting portion)
45c . . . Lower arm portion (arm portion, harness mounting portion
45e . . . Upper cut-out portion (cut-out portion)
45f . . . Lower cut-out portion (cut-out portion)
45g . . . Left cut-out portion (cut-out portion)
45p, 91c, 91d . . . Mounted portion
45s . . . Right cut-out portion (cut-out portion)
45x, 45y, 91g . . . Corner portion
61 . . . Main wire harness (wire harness)
65 . . . Wire harness for grounding (wire harness)
91a . . . Straight line portion (harness mounting portion)
91b . . . Bent portion (harness mounting portion)
91x . . . Cut-out portion

The invention claimed is:

1. A body frame reinforcing structure for a saddle riding vehicle that includes a right and left pair of down frames supporting an engine in a body frame, the right and left down frames being coupled using a cross member, wherein the cross member includes a plurality of mounted portions mounted on the right and left respective down frames;
wherein the cross member has a cut-out portion between the plurality of mounted portions; and,
wherein the cross member includes a harness mounting portion to which a wire harness is mounted, and the wire harness is passed through the cut-out portion.

2. The body frame reinforcing structure for the saddle riding vehicle according to claim 1,
wherein the cut-out portion have a corner portion that is formed into an arc shape.

3. The body frame reinforcing structure for the saddle riding vehicle according to claim 2,
wherein the cross member includes a plurality of arm portions including the plurality of mounted portions and a wide-width portion to which the plurality of arm portions are coupled, and the wide-width portion is formed to be wider than the plurality of arm portions.

4. The body frame reinforcing structure for the saddle riding vehicle according to claim 2,
wherein the plurality of mounted portions are mounted to an enlarged width portion and an engine supporting portion disposed in the down frame.

5. The body frame reinforcing structure for the saddle riding vehicle according to claim 1,
wherein the cross member is removably/attachably disposed with respect to the down frames, the cross member has a pair of the cut-out portions at least at opposed positions, and the wire harness is passed through only one cut-out portion of the pair of cut-out portions.

6. The body frame reinforcing structure for the saddle riding vehicle according to claim 5,
wherein the cross member includes a plurality of arm portions including the plurality of mounted portions and a wide-width portion to which the plurality of arm portions are coupled, and the wide-width portion is formed to be wider than the plurality of arm portions.

7. The body frame reinforcing structure for the saddle riding vehicle according to claim 5,
wherein the plurality of mounted portions are mounted to an enlarged width portion and an engine supporting portion disposed in the down frame.

8. The body frame reinforcing structure for the saddle riding vehicle according to claim 1,
wherein the cross member includes a plurality of arm portions including the plurality of mounted portions and a wide-width portion to which the plurality of arm portions are coupled, and the wide-width portion is formed to be wider than the plurality of arm portions.

9. The body frame reinforcing structure for the saddle riding vehicle according to claim 8,
wherein the plurality of mounted portions are mounted to an enlarged width portion and an engine supporting portion disposed in the down frame.

10. The body frame reinforcing structure for the saddle riding vehicle according to claim 1,
wherein the plurality of mounted portions are mounted to an enlarged width portion and an engine supporting portion disposed in the down frame.

11. The body frame reinforcing structure for the saddle riding vehicle according to claim 1,
wherein the plurality of mounted portions are fastened to the down frame from a vehicle front side.

12. The body frame reinforcing structure for the saddle riding vehicle according to claim 1, wherein the mounted portions disposed in an upper side among the plurality of mounted portions disposed on a right and left of the cross member have a wider interval mounted on the right and left down frames in a vehicle width direction.

* * * * *